Patented Sept. 26, 1944

2,359,218

UNITED STATES PATENT OFFICE 2,359,218

METHOD OF SWEETENING CHLORINATED ALIPHATIC HYDROCARBONS

Wilson Hunt and George M. Hebbard, Midland, Mich., assignors to The Dow Chemical Company, Midland, Mich., a corporation of Michigan No Drawing. Application May 31, 1941,
Serial No. 396,178

6 Claims. (Cl. 260—652)

This invention concerns a method of sweetening, or removing foul odors from, chlorinated aliphatic hydrocarbons which are contaminated with sulphur compounds.

A variety of chlorinated aliphatic hydrocarbons such as methyl chloride, methylene chloride, chloroform, carbon tetrachloride, ethyl chloride, propyl chlorides, butyl chlorides, amyl chlorides, ethylene chloride, propylene chloride, butylene chlorides, amylene chlorides, dichloro-ethylene, chloro-propylene, etc., are, or may be, manufactured readily by the reaction of chlorine or hydrogen chloride on natural gas or the various low boiling saturated and unsaturated hydrocarbons obtainable from petroleum. Methods for producing the chlorinated hydrocarbons from such starting materials are well known. In many instances the chlorinated products may be rendered nearly pure by usual purification procedures, e. g. distillation. However, even after careful purification by usual methods, the products often possess a foul foreign odor. This off-odor is not satisfactorily removed by redistillation or by scrubbing with aqueous alkali solutions.

It is an object of this invention to provide a method of removing the foul odor of such chlorinated hydrocarbon products. Other objects will be apparent from the following description of the invention.

We have found that the foul off-odor of such chlorinated hydrocarbons is due to the presence of a small proportion, usually less than 1 per cent by weight, of organic sulphur compounds which are apparently carried through from the hydrocarbon starting materials. The kinds of sulphur compounds present are not definitely known, but it is probable that there are more than one kind. We have further found that the odoriferous impurities may readily be reduced to form other compounds which either do not lend a foreign odor to the product or which, when of foul odor, are readily removed from the chlorinated hydrocarbon to recover the latter in a form relatively free of foreign odors. The process may, but does not always, further reduce the small proportion of chemically combined sulphur present and it seldom, if ever, results in complete removal of the sulphur compounds. Also, we have observed that the chlorinated hydrocarbons do not suffer appreciable loss of chlorine during the reduction, although when a chlorinated unsaturated hydrocarbon, e. g. a chloro-olefine, is subjected to the treatment it may undergo partial or complete hydrogenation to form the corresponding saturated chloro-hydrocarbon. Saturated chloro-hydrocarbons are substantially inert under the conditions required for reduction of the objectionable sulphur compounds.

The reduction of the objectionable sulphur-containing impurities may be carried out in the usual ways with any of a variety of reducing agents, e. g. hydrogen, sodium thiosulphate, or a mixture of aqueous alkali and a powdered or granulated metal such as aluminum, zinc, or iron, which is above hydrogen in the electromotive series, etc. It is most satisfactorily carried out catalytically in vapor phase using hydrogen as the reducing agent.

In practice, we usually vaporize the chlorinated hydrocarbon, admix the vapors with hydrogen, and pass the vapor mixture over or through a bed of solid hydrogenation catalyst. The proportion of hydrogen required is small, e. g. between 0.5 and 10 and usually from 1 to 5 per cent by volume of the vapor mixture, but it may be used in much larger proportions. As the hydrogenation catalyst, we ordinarily employ either reduced nickel or nickel sulphide which has been prepared from reduced nickel, but other hydrogenation catalyst such as those obtained by the reduction of mixtures of nickel and iron oxides, of nickel and cobalt oxides, of nickel and zinc oxides, of nickel and tin oxides, or of nickel and copper oxides, etc., may be used. The hydrogenation catalyst may be used in pure finely divided form, but is preferably employed on a supporting material such as pumice, alumina, granular diatomaceous earth, silica gel, Carborundum, or coke, etc.

The hydrogenation is usually carried out at atmospheric pressure or thereabout and at temperatures between 100° and 250° C., preferably between 150° and 225° C., but other temperatures and pressures may be used. The rate of vapor flow may be varied widely, the optimum velocity being dependent upon the concentration of the impurities to be reduced, the proportion of hydrogen employed, and the activity of the catalyst, etc. Satisfactory reduction is usually obtained by passing from 10 to 250 cubic feet per minute of the vapor mixture through a bed of the supported granular catalyst per cubic foot of said bed.

The vapors issuing from the catalyst chamber usually contain impurities of foul odor. They may be scrubbed directly with water or an aqueous solution of an alkali, e. g. a hydroxide, carbonate or bicarbonate of sodium or potassium, to remove any odoriferous sulphur-containing impurities in the product, or be cooled and compressed, if necessary, to condense the chlorinated hydrocarbon which may then be treated to remove such impurities. Removal of the odoriferous impurities from the so-treated chlorinated hydrocarbon may be effected by any of several usual purification procedures, e. g. fractional distillation of the product or, as just indicated, by scrubbing with water or an aqueous alkali solution.

The following examples describe certain ways in which the principle of the invention has been applied, but are not to be construed as limiting the invention.

EXAMPLE 1

Table I, below, describes the results obtained in a series of tests on the removal of foul odors from ethyl chloride by hydrogenation. The ethyl chloride employed in each test had been prepared by the reaction of hydrogen chloride with ethylene which had been produced by the pyrolysis of a petroleum fraction. It was of greater than 99 per cent purity, but possessed a pronounced foul odor and contained 0.011 per cent by weight of sulphur in chemically combined form. In each experiment, such ethyl chloride was vaporized and mixed with hydrogen to form a vapor mixture containing the per cent by volume of hydrogen given in the table. The vapor mixture was passed at approximately atmospheric pressure over a granular hydrogenation catalyst consisting of nickel sulphide (prepared from reduced nickel and hydrogen sulphide) supported on granular diatomaceous earth. The space velocity, i. e. the cubic feet per minute of the vapor mixture, calculated for standard conditions, flowing through the catalyst bed per cubic foot of the latter, and the temperature within the catalyst bed are given by the table. The vapors flowing from the catalyst chamber were cooled to condense the ethyl chloride. The condensate was washed with a dilute aqueous sodium hydroxide solution, dried, analyzed to determine its sulphur content and tested for odor. No odor foreign to ethyl chloride could be detected in any of so-treated samples.

Table I

| Run No. | Percent $H_2$ in vapors | Space velocity | Catalyst temperature | Properties of product | |
|---|---|---|---|---|---|
| | | | | S content | Foreign odor |
| | | Cu. ft./min. | °C. | Percent | |
| 1 | 5 | 25 | 200–210 | 0.0065 | None |
| 2 | 5 | 50 | 208 | 0.0063 | None |
| 3 | 2 | 25 | 198 | 0.0052 | None |
| 4 | 2 | 50 | 198 | 0.0097 | None |

From the above tests it will be seen that the impurities of foul odor were readily reduced into compounds removable by mere washing of the product with aqueous alkali. It will also be seen that only a portion of the sulphur-containing impurities need be removed in order to eliminate the foul odor from the product.

EXAMPLE 2

The purpose of this example is to illustrate the effectiveness of other reducing agents in removing the foreign odor from sulphur-containing ethyl chloride. In each of a series of experiments 200 cubic centimeters of liquid ethyl chloride of greater than 99 per cent purity, but which possessed a strong foul odor and contained about 0.04 per cent of chemically combined sulphur, was distilled. In certain of the experiments the ethyl chloride vaporized during the distillation was passed through the reducing agent named in the following table prior to being condensed. The distillate was analyzed for sulphur and examined for odors foreign to ethyl chloride. Table II gives the kind and quantity of reducing agent used in each experiment, the per cent by weight of sulphur in the treated product and describes the odor of the product.

Table II

| Run No. | Reducing agent | | Properties of product | |
|---|---|---|---|---|
| | Ingredients | Weight in grams | S content | Foreign odor |
| | | | Percent | |
| 1 | None | | 0.041 | Strong |
| 2 | Zn | 5 | | |
| | 10% aqu. NaOH solution | 178 | 0.034 | None |
| 3 | Al | 5 | | |
| | 10% aqu. NaOH solution | 178 | | None |
| 4 | 0.1 N. $Na_2S_2O_3$ solution | 160 | 0.04 | None |

The method herein disclosed may be applied in removing foul odors from chlorinated hydrocarbons whenever such odor is due to the presence of sulphur-containing impurities incident to their manufacture. For instance, it may be applied in removing foreign odors from chlorohydrocarbons which have been prepared by the chlorination of hydrocarbons in the presence of sulphur as a catalyst, or by the chlorination of organic sulphides to displace the sulphur with chlorine, etc.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for removing an objectionable foreign odor from a chlorinated aliphatic hydrocarbon which has been prepared by reacting an agent selected from the class consisting of chlorine and hydrogen chloride with a low boiling aliphatic hydrocarbon obtainable from natural gas or petroleum and which contains as an impurity incident to its manufacture a foul-odored organic sulphur compound, the steps of chemically reducing the odoriferous sulphur compound by reacting the latter with a reducing agent and removing an odoriferous reduction product from the chlorinated hydrocarbon by scrubbing the latter with an aqueous solution of an alkaline agent.

2. In a method for removing an objectionable foreign odor from a chlorinated aliphatic hydrocarbon which has been prepared by reacting an agent selected from the class consisting of chlorine and hydrogen chloride with a low boiling aliphatic hydrocarbon obtainable from natural gas or petroleum and which contains as an impurity incident to its manufacture a foul-odored organic sulphur compound the steps which consist in vaporizing the chlorinated hydrocarbon, admixing the vapors with a minor proportion of hydrogen and passing the resultant vapor mixture over a hydrogenation catalyst at a reaction temperature between 100° and 250° C., whereby reduction of the odoriferous sulphur compound is effected, and removing any odoriferous reduction products from the chlorinated hydrocarbon by scrubbing the latter with an aqueous solution of an alkaline agent.

3. In a method for removing an objectionable foreign odor from a chlorinated aliphatic hydrocarbon which has been prepared by reacting an agent selected from the class consisting of chlorine and hydrogen chloride with a low boiling aliphatic hydrocarbon obtainable from natural gas or petroleum and which contains as an impurity incident to its manufacture a foul-odored organic sulphur compound the steps which consist in vaporizing the chlorinated hydrocarbon, admixing the vapors with hydrogen to form a vapor mixture containing between 0.5 and 10 per cent by volume of hydrogen, passing the vapor mixture over a hydrogenation catalyst at a reaction temperature between about 150° and about 225° C., whereby reduction of the odoriferous sulphur compound is effected, and thereafter scrubbing the reduction product from the chlorinated hydrocarbon with an aqueous solution of an alkali.

4. In a method for removing an objectionable foreign odor from a chlorinated aliphatic hydrocarbon which has been prepared by reacting an agent selected from the class consisting of chlorine and hydrogen chloride with a low boiling aliphatic hydrocarbon obtainable from natural gas or petroleum and which contains as an impurity incident to its manufacture a foul-odored organic sulphur compound the steps which consist in admixing vapors of the chlorinated hydrocarbon with hydrogen to form a vapor mixture containing between 1 and 10 per cent by volume of hydrogen, passing the vapor mixture over a hydrogenation catalyst at a reaction temperature between about 150° and about 225° C., whereby reduction of the odoriferous sulphur compound is effected, cooling the vapors to condense the chlorinated hydrocarbon, and scrubbing the latter with an aqueous solution of an alkali.

5. In a method for removing an objectionable foreign odor from ethyl chloride which has been prepared by reacting hydrogen chloride with the ethylene produced by pyrolysis of a petroleum fraction and which contains as an impurity incident to its manufacture a foul-odored organic sulphur compound, the steps which consist in chemically reducing the odoriferous sulphur-containing impurity by reacting the latter with a reducing agent and removing the odoriferous reduction product by scrubbing the ethyl chloride with an aqueous solution of alkaline agent.

6. In a method for removing an objectionable foreign odor from ethyl chloride which has been prepared by reacting hydrogen chloride with the ethylene produced by pyrolysis of a petroleum fraction and which contains as an impurity incident to its manufacture a foul-odored organic sulphur compound, the steps which consist in contacting a vapor mixture of the ethyl chloride and between 1 and 10 per cent by volume of hydrogen with a hydrogenation catalyst at a reaction temperature between about 150° and about 225° C., whereby the odoriferous impurity is reduced, thereafter cooling the mixture to condense the ethyl chloride and scrubbing the latter with an aqueous solution of an alkali to remove a foul-odored impurity therefrom.

WILSON HUNT.
GEORGE M. HEBBARD.